United States Patent [19]

Connolly

[11] Patent Number: 4,746,566

[45] Date of Patent: May 24, 1988

[54] OPTICALLY ANISOTROPIC MELT FORMING AROMATIC COPOLYESTERS BASED ON T-BUTYL-4-HYDROXYBENZOIC ACID

[75] Inventor: Mark S. Connolly, Wilmington, Del.

[73] Assignee: E. I. DuPont de Nemours and Company, Wilmington, Del.

[21] Appl. No.: 46,560

[22] Filed: May 6, 1987

[51] Int. Cl.⁴ .............................................. B32B 27/00
[52] U.S. Cl. ............................... 428/290; 264/331.21;
528/171; 528/173; 528/176; 528/190; 528/193;
528/194; 528/206
[58] Field of Search ............... 428/290; 528/171, 173,
528/176, 190, 193, 194, 206; 264/331.21

[56] References Cited

U.S. PATENT DOCUMENTS

| | | | |
|---|---|---|---|
| 4,118,372 | 10/1978 | Schaefgen | 528/190 |
| 4,219,461 | 8/1980 | Calundann | 260/40 P |
| 4,299,756 | 11/1981 | Calundann | 260/40 R |
| 4,447,593 | 5/1984 | Funakoshi et al. | 528/176 |
| 4,536,561 | 8/1985 | Schmidt et al. | 528/191 |
| 4,564,669 | 1/1986 | Dicke et al. | 528/173 |
| 4,600,764 | 7/1986 | Dicke et al. | 528/128 |
| 4,603,190 | 7/1986 | Dicke et al. | 528/193 |
| 4,609,720 | 9/1986 | Yoshimura et al. | 528/190 |
| 4,617,369 | 10/1986 | Huynh-Ba | 528/128 |
| 4,664,972 | 5/1987 | Connolly | 428/290 |
| 4,667,011 | 5/1987 | Eckhardt et al. | 528/128 |
| 4,668,760 | 5/1987 | Boudreaux et al. | 528/193 |

FOREIGN PATENT DOCUMENTS

| | | |
|---|---|---|
| 52-114724 | 9/1977 | Japan . |
| 58-134116 | 8/1983 | Japan . |
| 59-213721 | 12/1984 | Japan . |

Primary Examiner—Lucille M. Phynes

[57] ABSTRACT

Novel copolyesters derived from (a) aromatic diols, (b) dicarboxylic acids and (c) aromatic hydroxycarboxylic acids, in which the aromatic hydroxycarboxylic acid component (c) comprises 20 to 60 mole % of the copolyester and in which t-butyl-4-hydroxybenzoic acid constitutes 25 to 100 mole % of the aromatic hydroxycarboxylic acid component (c), are disclosed. These copolyesters are anisotropic and fabricable in the melt. They generally can be processed using conventional thermoplastic shaping techniques at temperatures below 350° C. into moldings, fibres and films which have outstanding mechanical properties.

23 Claims, No Drawings

OPTICALLY ANISOTROPIC MELT FORMING AROMATIC COPOLYESTERS BASED ON T-BUTYL-4-HYDROXYBENZOIC ACID

BACKGROUND OF THE INVENTION

This invention relates to novel aromatic copolyesters that are optically anisotropic in the melt and that are derived from (a) a mixture of aromatic diols, (b) aromatic dicarboxylic acids, and (c) t-butyl-4-hydroxybenzoic acid. The key to this invention is the incorporation of t-butyl-4-hydroxybenzoic acid into the claimed copolyesters. These polymers range from glassy to semicrystalline and are unexpectedly melt processable at temperatures generally at or below 350 degrees C.

Optically anisotropic melt forming aromatic copolyesters based on various combinations of aromatic diols, aromatic dicarboxylic acids and aromatic hydroxycarboxylic acids are well known in the art. Due to the melt anisotropy of such aromatic copolyesters, shaped articles such as films and fibers made from them tend to have excellent mechanical properties. Unfortunately, the copolyesters also tend to have very high crystalline melting temperatures, a factor which makes it difficult to process them in conventional melt-processing equipment.

The art is replete with attempts to improve the melt processability of anisotropic aromatic copolyesters (generally, by lowering crystalline melting temperatures) by altering one or more of the components in the polymer. For example, some have tried to achieve lower melting points by incorporating different substituents on the aromatic rings or by using some aromatic rings having chain extending linkages which are neither parallel nor coaxial. Numerous attempts have involved altering the aromatic hydroxycarboxylic acid component of the copolyester, as is the case in the present invention.

U.S. Pat. No. 4,447,593 to Funakoshi et al. discloses an aromatic polyester having melt anisotropy and an optional hydroxycarboxylic acid component which can be a mono-substituted p-hydroxybenzoic acid. The substituted p-hydroxybenzoic acid is preferably substituted by an alkyl group having 1 to 4 carbon atoms or by a halogen atom. The compound 3-t-butyl-4-hydroxybenzoic acid is included as an example of a suitable substituted p-hydroxybenzoic acid (column 5, lines 56–57, and Example 24 describes a polymer derived from (diphenylmethyl)hydroquinone, terephthalic acid, and 3-t-butyl-4-hydroxybenzoic acid.

U.S. Pat. No. 4,603,190 to Dicke et al. discloses thermotropic aromatic polyesters derived from (a) optionally substituted p-hydroxybenzoic acid, (b) isophthalic and optionally terephthalic acid, (c) hydroquinone and (d) certain polyaromatic diols. The preferred p-hydroxybenzoic acids are p-hydroxybenzoic acids substitued in the nucleus by $C_1$–$C_4$ alkyl or alkoxy, $C_6$–$C_{10}$ aryl or $C_7$–$C_{12}$ alkaryl groups or halogen. There is no express disclosure of t-butyl-4-hydroxybenzoic acid, and it is indicated that unsubstituted p-hydroxybenzoic acid is the particularly preferred hydroxycarboxylic acid. U.S. Pat. Nos. 4,600,764 and 4,564,669 to Dicke et al. disclose similar thermotropic aromatic polyesters incorporating an optionally substituted p-hydroxybenzoic acid as described in U.S. Pat. No. 4,603,190.

U.S. Pat. No. 4,536,561 to Schmidt et al. discloses thermotropic, wholly aromatic polyesters based on (a) p-hydroxybenzoic acid, (b) 3-chloro-4-hydroxybenzoic acid, (c) isophthalic acid, (d) hydroquinone and (e) certain polyaromatic diols. The p-hydroxybenzoic acid (a) may be substituted by $C_1$–$C_4$ alkyl or alkoxy, $C_6$–$C_{10}$ aryl or $C_7$–$C_{12}$ alkaryl groups. As in the previously mentioned patents to Dicke et al., there is no express disclosure of t-butyl-4-hydroxybenzoic acid, and it is indicated that unsubstituted p-hydroxybenzoic acid is the particularly preferred hydroxycarboxylic acid.

U.S. Pat. No. 4,299,756 to Calundann discloses melt processable wholly aromatic polyesters derived from (I) 2- or 3-phenyl-4-hydroxybenzoic acid, (II) 4-hydroxybenzoic acid, (III) at least one dioxy aryl compound which can be either hydroquinone or certain polyaromatic diols, and (IV) at least one dicarboxyl aryl moiety such as terephthalic acid. The patent thus discloses the incorporation in a polyester of a 4-hydroxybenzoic acid substituted with a phenyl group; however, there is no mention of the use of a 4-hydroxybenzoic acid substituted with any other substituent, e.g., a t-butyl substituent.

Despite the wealth of work which has been done in developing new optically anisotropic melt forming aromatic copolyesters, there still exists a need for such polymers which can be easily and economically processed. It is therefore an object of this invention to provide optically anisotropic melt forming copolyesters which possess a high degree of processability and outstanding mechanical properties. Another object of this invention is to produce optically anisotropic melt forming aromatic copolyesters which may be processed by thermoplastic shaping to produce moldings, fibers, and films which have a high strength and stiffness.

Surprisingly, it has been found that the copolyesters described below have this desired combination of advantageous properties.

SUMMARY OF THE INVENTION

The novel copolyesters of this invention are derived from components consisting essentially of:

I. an aromatic diol component consisting of about 55 to 95 mole % of one or more diols of the formula

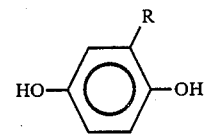

where R is selected from the group consisting of H, $C_1$–$C_4$ alkyl or alkoxy, $C_6$–$C_{10}$ aryl or aryloxy, and halogen; and about 5 to 45 mole % of one or more polyaromatic diols;

II. a dicarboxylic acid component selected from "para"- or "meta"-oriented aromatic dicarboxylic acids and mixtures thereof, provided that any napthalene dicarboxylic acid comprises not greater than about 60 mole % of the dicarboxylic acid component; and III. an aromatic hydroxycarboxylic acid component consisting of about 25 to 100 mole % of a t-butyl-4-hydroxybenzoic acid and about 0 to 75 mole % of 4-hydroxybenzoic acid, provided that when R=H, the aromatic hydroxycarboxylic acid component consists solely of a t-butyl-4-hydroxybenzoic acid;

where said copolyester contains equal chemical equivalents of components I and II and contains about 15 to 60 mole %, based on total moles of I plus II plus III, of component III.

These novel copolyesters are advantageous because they are fabricable in the melt using conventional molding equipment and techniques, generally at temperatures below 350 degrees C. They are anisotropic in the melt which leads to their utility as engineering plastics where high mechanical properties (e.g., stiffness and strength) and moderate temperature resistance are needed. Surprisingly, tests indicate that the copolyesters of this invention have densities significantly lower than corresponding copolyesters not containing a t-butyl-4-hydroxybenzoic acid component.

DETAILED DESCRIPTION OF THE INVENTION

All of the components used to prepare the copolyesters of this invention are either available commercially or may be prepared by methods well known in the art. The t-butyl-4-hydroxybenzoic acids may be prepared using the Kolbe-Schmitt reaction whereby the appropriate t-butyl substituted phenol is reacted with carbon dioxide in accordance with known techniques.

The major diol component (I) in the copolyester of this invention is unsubstituted or mono-substituted hydroquinone. The preferred such diols are unsubstituted hydroquinone, or hydroquinone mono-substituted with a methyl group, chlorine, a phenyl group or a t-butyl group, and the more preferred such diols are unsubstituted hydroquinone or hydroquinone mono-substituted with chlorine, a phenyl group or a t-butyl group. Preferably, the major diol component comprises about 70 to 95% of the overall diol component in the copolyester, more preferably 75 to 90% of the overall diol component.

The minor diol component (I) in the copolyester of this invention is a polyaromatic diol or mixture of said diols. The term "polyaromatic" as used in this application means that the diol has two or more aromatic ring structures at least two of which form part of the backbone of the copolyester of the invention. The aromatic rings may be fused (e.g., as in naphthalene), may be directly linked (e.g., as in diphenyl), or may be connected by other moieties (e.g., as in bisphenol-A, bisphenol-AF or diphenylsulfone). The preferred diols are compounds in which, in a realistic planar representation, the bonds joining the diolic oxygens to the rest of the molecule are either colinear or parallel to each other and are not in an ortho or a peri relationship (as would be the case, e.g., with 1,8-dihydroxynaphthalene). Examples of such diol moieties are as follows:

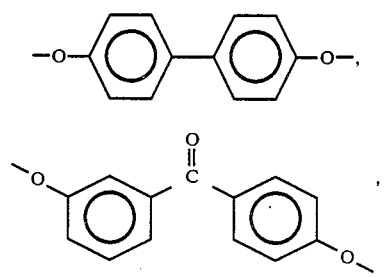

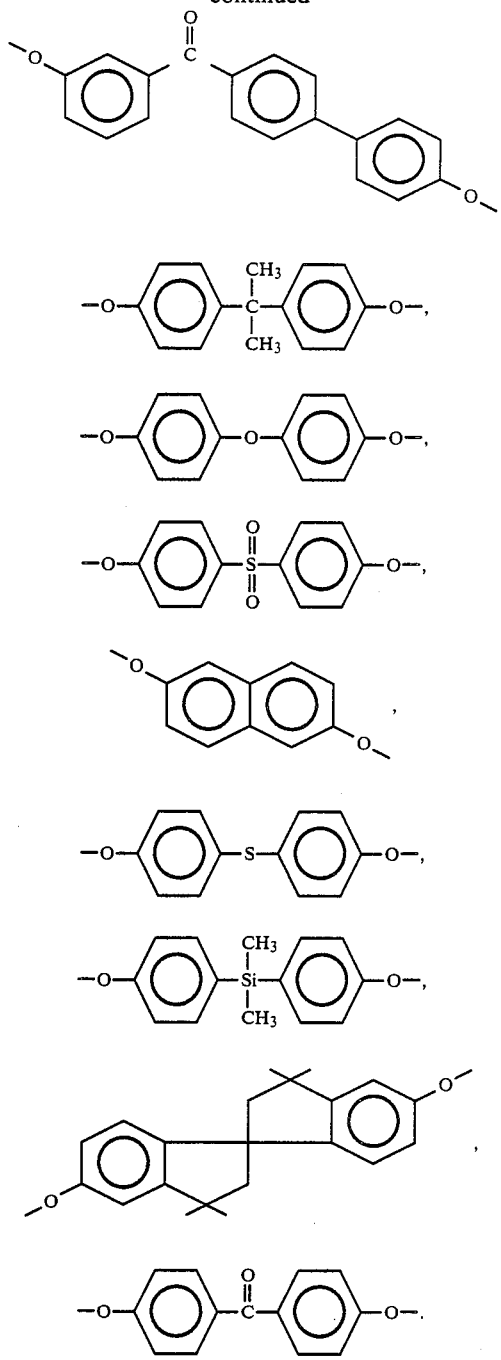

The 3,4' derivatives of these diols may also be used. The aromatic rings in the diol may optionally be substituted with one or more substitutents, e.g., alkyl, halogen, or alkyloxy and others. The preferred minor diols are 4,4'-dihydroxydiphenyl (4,4'-biphenol), 2,2'-bis(4-hydroxyphenyl)propane (bisphenol-A), 3-hydroxy-4'-(4-hydroxyphenyl)benzophenone, 3,4' or 4,4'-dihydroxybenzophenone, 2,6- or 2,7-dihydroxy-naphthalene, 4,4'-dihydroxydiphenylsulfone, 4,4'-dihydroxydiphenylether, and 4,4'-dihydroxydiphenylsulfide. The most preferred minor diols are bisphenol-A and 4,4'-biphenol.

The dicarboxylic acid component of the copolyester of this invention may be one or more acids selected from "para"- or "meta"-oriented aromatic dicarboxylic acids, provided that no more than 60 mole % of the dicarboxylic acid component comprises a naphthalene dicarboxylic acid. Examples of "para"-oriented aromatic dicarboxylic acids are terephthalic acid, 1,4-naphthalene dicarboxylic acid, 1,5-napththalene dicarboxylic acid, 2,6-naphthalene dicarboxylic acid, 4,4'-diphenyl dicarboxylic acid and 3,3'-diphenyl dicarboxylic acid. (The "para"-oriented dicarboxylic acids are those in which the two carboxyl groups bonded to the aromatic rings are not adjacent to each other or in a peri relationship but are arranged coaxially or parallelly in a realistic planar representation of the molecule.) Examples of "meta"-oriented dicarboxylic acids are isophthalic acid, 1,3-naphthalene dicarboxylic acid, 1,6-naphthalene dicarboxylic acid, 1,7-naphthalene dicarboxylic acid, 2,7-naphthalene dicarboxylic acid, and 3,4'-diphenyl dicarboxylic acid. (The "meta"-oriented dicarboxylic acids are those in which the two carboxyl groups bonded to the aromatic ring(s) are not adjacent to each other or in a peri relationship and are not arranged coaxially or parallelly in a realistic planar representation of the molecule.) Any of these aromatic dicarboxylic acids may optionally be substituted with one or more substituents such as alkyl, alkyloxy or halogen, to name a few. The preferred dicarboxylic acids are terephthalic acid and mixtures of terephthalic acid with less than 50 mole % of either isophthalic acid or 2,6-naphthalene dicarboxylic acid. The more preferred dicarboxylic acid is terephthalic acid.

As previously indicated, a key to the copolyesters of this invention is the fact that they contain about 15 to 60 mole %, based on total moles of copolyester, of an aromatic hydroxycarboxylic acid component (III) selected from t-butyl-4-hydroxybenzoic acid or mixtures of t-butyl-4-hydroxybenzoic acid with unsubstituted 4-hydroxybenzoic acid; however, when the major diol component of the copolyester is unsubstituted hydroquinone, the aromatic hydroxycarboxylic acid component (III) consists solely of a t-butyl-4-hydroxybenzoic acid. Preferably, the copolyesters contain about 20 to 50 mole % and, more preferably about 20 to 35 mole %, based on total moles of copolyester, of aromatic hydroxycarboxylic acid component (III). The t-butyl-4-hydroxybenzoic acid is preferably 3-t-butyl-4-hydroxybenzoic acid, but may also be 2-t-butyl-4-hydroxybenzoic acid or a mixture of the 3- and 2- isomers. Preferably, component III consists of at least 75% 3-t-butyl-4-hydroxybenzoic acid and, more preferably, component III consists solely of 3-t-butyl-4-hydroxybenzoic acid.

The preferred copolyesters of this invention consist essentially of:

| I. Diol: | 95–70 mole % of one or more diols selected from hydroquinone or hydroquinone mono-substituted with methyl, chlorine, phenyl or t-butyl; 5–30 mole % of one or more diols selected from 4,4'-biphenol; bisphenol-A; 3-hydroxy-4'-(4-hydroxyphenyl)benzophenone, 3,4' or 4,4'-dihydroxybenzophenone, 2,6- or 2,7-dihydroxynaphthalene, 4,4'-dihydroxydiphenylsulfone, 4,4'-dihydroxydiphenylether and 4,4'-dihydroxydiphenylsulfide |
| --- | --- |
| II. Dicarboxylic acid: | terephthalic acid or mixtures of terephthalic acid and isophthalic acid or 2,6-naphthalene dicarboxylic acid, such mixtures containing greater than 50 mole % terephthalic acid. |
| III. Hydroxycarboxylic acid: | 20–50 mole %, based on moles of I + II + III, of aromatic hydroxycarboxylic acid selected from 3-t-butyl-4-hydroxybenzoic acid or mixtures of 3-t-butyl-4-hydroxybenzoic acid with up to 25 mole % 4-hydroxybenzoic acid; provided that when the major diol component is unsubstituted hydroquinone, the aromatic hydroxycarboxylic acid consists solely of 3-t-butyl-4-hydroxybenzoic acid. |

The most preferred copolyesters of this invention, by virtue of the east with which they can be made and processed, their density properties and the outstanding mechanical properties which they possess, consist essentially of:

| I. Diol: | 90–75 mole % of unsubstituted hydroquinone or phenyl-, chloro- or t-butyl-substituted hydroquinone; 10–25 mole % 4,4'-biphenol or bisphenol-A. |
| --- | --- |
| II. Diacid: | Terephthalic acid. |
| III. Hydroxyacid: | 20–35 mole %, based on moles I + II + III, of 3-t-butyl-4-hydroxybenzoic acid. |

The copolyesters of this invention may be prepared by conventional polymerization techniques such as described in U.S. Pat. No. 4,118,372 and in the examples below, preferably under anhydrous conditions in an inert atmosphere. The copolyesters may be formed by a variety of ester-forming techniques from organic monomers possessing functional groups which upon condensation form the requisite recurring moieties. For example, the functional groups of the organic aromatic monomer compounds may be carboxylic acid groups, acyloxy groups, acid halide groups, etc. The organic monomer compounds may be allowed to react in the absence of a heat exchange fluid via a melt acidolysis procedure, in a suitable solvent via a solution procedure, or in a heat exchange medium via a slurry polymerization as described in U.S. Pat. No. 4,067,852.

The copolyesters of this invention are anisotropic in the molten state at temperatures below approximately 400 degrees C., a factor which should lead to high orientation, high strength, and high initial modulus of shaped articles made from these copolyesters. Optical anisotropy of the copolyester melts can be determined by examination of the materials with the use of an optical microscope. It is known that optically anisotropic materials cause plane polarized light to be rotated, whereas rotation of polarized light is zero for transmission through isotropic materials. Thus, optical anisotropy can be determined by placing a sample of the polymer on a heating stage of a microscope set with crossed polarizers and increasing the temperature beyond the polymer flow temperature. If the polymer is optically anisotropic in the melt, a bright static field will be observed at temperatures above the polymer flow temperature. These observations may be confirmed by the use of the Thermooptical Test (TOT) described in U.S. Pat. Nos. 4,066,620 and 4,118,372. Polymers which pass this test are considered to be optically anisotropic.

The glass transition temperatures (Tg) of the copolyesters of this invention generally range from about 140–200 degrees C., preferably about 150–190 degrees C. The inherent viscosity of the copolyesters (measured as described below) is generally at least 0.5 dL/g, preferably about 1.5 dL/g or greater.

The copolyesters of this invention can be used in the form of shaped articles which can be prepared from the melt phase by extrusion, injection molding, compression molding or other convenient means. Such shaped articles include films, fibers, mechanical parts and the like. The copolyesters of this invention may also be used in the form of coatings. Using common coating techniques, coatings can be applied to wire, films, fabrics, etc.

Composite structures can be prepared using known methods by combining the copolyesters of this invention with fibrous substrates or particulate fillers or by combining fibers of the copolyesters of this invention with resin materials. Fibrous substrates can include woven, nonwoven, tow, felt or undirectional continuous fibers. For many applications, such as various aerospace components, carbon fibers, and aramid fibers, which produce light and strong composites, are most preferred. Other fibers include, among others, glass, boron and asbestos fibers. Particulate fillers include carbon and graphite powders, mica, silica, clay and silicon carbide whiskers. The composite structures may optionally contain additives such as antioxidants, pigments, coupling agents for fillers, lubricants and anti-stick agents.

The copolyesters of this invention, their properties, their preparation and use are further illustrated by the following examples. The following test procedures were used to measure properties of the copolyesters in the examples.

Inherent viscosity ($n_{inh}$), a measure of molecular weight, was computed from $n_{inh} = (\ln n_{rel})/C$ where $n_{rel}$ is the relative viscosity and C is solution concentration in grams of polymer per deciliter of solvent. Relative viscosity is the ratio of polymer solution flow time to solvent flow time in a capillary viscometer at 25 degrees C. The solvent mixture employed consisted of 50% by volume 1,2-dichloroethane and 50% by volume 4-chlorophenol. (Other solvents which could be used include pentafluorophenol, hexafluoroisopropanol or straight 4-chlorophenol.) The concentration was 0.5 g polymer per deciliter of solvent.

Thermal characterization of the polymers by differential scanning calorimetry (DSC) was performed with the use of a Du Pont Model 1090 Thermal Analyzer, equipped with a Du Pont DSC cell. A known weight of polymer (usually 5 to 10 mg) was sealed in an aluminum DSC pan and maintained under nitrogen throughout the test. The sample was subjected to a heating cycle to remove the effects of prior thermal history. This cycle consisted of heating from room temperature to 360 to 420 degrees C. at a rate of 25 degrees/minute, followed by holding the sample at the final temperature for 0 to 2 minutes. The sample was then cooled from the upper hold temperature to 30 to 40 degrees C. at a rate of 30 degrees/minute and then maintained at 30 to 40 degrees C. for two minutes. The sample was then subjected to a second heat-up cycle. This cycle consisted of heating the sample from the lower hold temperature to 360 to 420 degrees C. at a rate of 25 degrees C./minute. The glass transition temperature (Tg) is defined as the midpoint of the change in heat flow from the curve of heat flow versus temperature. The crystalline melting temperature ($T_m$) is defined as the maximum of the characteristic melting endotherm. The $T_m$ is recorded from the first heat-up cycle, whereas $T_g$ is recorded from the second heat-up cycle.

Flexural properties of injection molded samples were measured at room temperature with an Instron machine by using a cross-head speed of 0.05 inch/min and a span of 1.0 inch. The modulus (Mod) reported is the initial Young's modulus in Kpsi units derived from a stress-strain curve determined with the use of an Instron 0.5 Inch Extensometer. The strength (Str) is the strength at break in Kpsi units and the elongation (El) is the elongation at break in percent. Flexural properties were measured for samples in the form of flexural bars with cross section of 1/16 inch × ½ inch. The flexural properties reported in the examples represent average properties for at least five samples.

The density of the polyesters of this invention was measured by using a density gradient technique according to ASTM D1505. Samples were used in the form of compression molded film with a thickness of about 0.008–0.010 inch. The density values reported in the examples represent the average properties for three samples.

In the following examples, unless otherwise indicated, the copolyesters were injection molded using a Watson Stillman one ounce injection molding machine. The ram speed was about 62 inch/min., and the total cycle time was about 40 seconds. Specific barrel temperature and pressure conditions are presented in the examples.

The following abbreviations are used in the examples:
HQ = hydroquinone
BP = 4,4'-biphenol
TPA = terephthalic acid
1,4HBA = 4-hydroxybenzoic acid
TBHBA = 3-t-butyl-4-hydroxybenzoic acid The copolyesters made in the examples were prepared in a kettle fitted with (1) a stainless steel stirrer extended through a pressure-tight resin bushing, (2) a nitrogen inlet, and (3) a short column leading to a water-cooled condenser with a receiver for collecting acetic acid by-product. An attachment for application of vacuum was also provided. An electrically heated Wood's metal bath mounted for vertical adjustment was used for heating. The reaction mixture was heated to increasing temperatures with stirring at atmospheric pressure under nitrogen purge until at least about 85% of the theoretical acetic acid had evolved. The vacuum was then applied and pressure gradually reduced from atmospheric to generally less than 1 mm of mercury. Heating under vacuum at less than 1 mm mercury pressure was then continued until viscosity had increased to a level believed satisfactory for processing into useful articles. For example, this period could have been less than 30 minutes if the final material was to be melt-spun into fibers, or could have been as long as 2 hours if the final material was to be injection-molded into shaped articles. The polymer was removed from the resin kettle while hot, cooled to room temperature, and comminuted prior to processing.

In the examples, the copolyesters were prepared from the diacetate of the aromatic diols and the mono-acetate of the aromatic hydroxycarboxylic acid. The acetate derivatives were either added directly to the resin kettle or were prepared in situ. The dicarboxylic acids were used as such rather than as esters or other derivatives. The monomer ingredients were added in substantially the same molar ratios as desired in the final polymer except that an excess (usually about 0.1 to 4%) of the hydroquinone component (major diol component, I) was used.

EXAMPLE 1

A polymer with the composition
26.7 mole % HQ
6.7 mole % BP
33.3 mole % TPA
33.3 mole % TBHBA
was prepared by mixing the following in the polymerization vessel:
31.3 g HQ diacetate (0.161 mole including 0.5% excess)
7.4 g BP (0.040 mole)
33.2 g TPA (0.200 mole)
38.8 g TBHBA (0.200 mole)
30.3 g acetic anhydride (0.297 mole)

The mixture was heated with continuous stirring in the polymerization vessel from approximately 145 degrees C. to approximately 295 degrees C. during 200 minutes at atmospheric pressure under nitrogen purge. The reaction mixture was then heated to about 330 degrees C. during 30 minutes after which time approximately 85% of theoretical acetic acid had evolved and was removed from the vessel. During about 60 minutes, the pressure was reduced from atmospheric to less than 15 mm mercury. The heating was continued at 330 degrees C. and the pressure was reduced further to below 0.45 mm mercury during about 80 minutes.

After cooling and solidification, 74.6 g (87% of theoretical) of polymer was recovered. The resultant polymer displayed a crystalline melting endotherm at 394 degrees C., as determined by differential scanning calorimetry. Inherent viscosity was 1.80 dL/g measured in 1,2-dichloroethane/4-chlorophenol (50/50, v/v). The polymer formed an optically anisotropic melt at its flow temperature of 318 degrees C. up to at least 400 degrees C., as determined by optical microscopy (TOT). A tough opaque film could be pressed easily at 350 degrees C. The comminuted polymer was injection molded at 330 degrees C. and 280 pounds/squre inch pressure into flexural bars. The flexural modulus, flexural strength, and elongation at break were measured to be 1127 Kpsi, 18.0 Kpsi and 2.1% respectively.

EXAMPLES 2-7 AND COMPARATIVE EXAMPLES A-D

Using the same general procedure as that outlined in Example 1, the copolyesters described in Tables 1a-d were prepared. Their properties are listed in Tables 2a-d and 3a-d. For purposes of comparison, information for the copolyester in Example 1 is included in these tables. The "TOT" described above was used to test the polymer melt for optical anisotropy (Opt. Anis. Melt, in Tables 2).

TABLE 1a

Copolyester Composition (Amounts in mole percent)

| Ex. | "R"-substituted hydroquinone | R | BP | T | 1,4HBA | TBHBA |
|---|---|---|---|---|---|---|
| 1 | 26.7 | H | 6.7 | 33.3 | — | 33.3 |
| A | 26.7 | H | 6.7 | 33.3 | 33.3 | — |

TABLE 2a

Properties of Copolyesters

| Ex. | Inherent Viscosity (dL/g) | Density (g/cc) | Tg(°C.) | Mp(°C.) | Opt. Anis. Melt |
|---|---|---|---|---|---|
| 1 | 1.80 | 1.2651 | 165 | 394 | Yes |
| A | insoluble | 1.4119 | 119 | >>400 | No |

TABLE 3a

Flexural Properties of Copolyesters

| Ex. | Injection Temp (°C.) | Pressure (psi) | Modulus (Kpsi) | Strength (Kpsi) | Elong @ Break(%) |
|---|---|---|---|---|---|
| 1 | 330 | 280 | 1127 | 18.0 | 2.1 |
| A | Not measured; Could not be injection molded | | | | |

TABLE 1b

Copolyester Composition (Amounts in mole percent)

| Ex. | "R"-substituted hydroquinone | R | BP | T | 1,4HBA | TBHBA |
|---|---|---|---|---|---|---|
| 2 | 32.0 | t-butyl | 8.0 | 40.0 | — | 20.0 |
| 3 | 26.7 | " | 6.7 | 33.3 | 16.65 | 16.65 |
| 4 | 26.7 | " | 6.7 | 33.3 | — | 33.3 |
| B | 32.0 | t-butyl | 8.0 | 40.0 | 20.0 | — |

TABLE 2b

Properties of Copolyesters

| Ex. | Inherent Viscosity (dL/g) | Density (g/cc) | Tg(°C.) | Mp(°C.) | Opt. Anis. Melt |
|---|---|---|---|---|---|
| 2 | 2.17 | 1.2339 | 181 | None | Yes |
| 3 | 4.57 | 1.2505 | 180 | None | Yes |
| 4 | 4.45 | 1.2244 | 178 | None | Yes |
| B | insoluble | — | 186 | 371 | Yes |

TABLE 3b

Flexural Properties of Copolyesters

| Ex. | Injection Temp (°C.) | Pressure (psi) | Modulus (Kpsi) | Strength (Kpsi) | Elong @ Break(%) |
|---|---|---|---|---|---|
| 2 | 310 | 400 | 1640 | 27.3 | 2.0 |
| 3 | 300 | 250-300 | 2255 | 37.6 | 2.7 |
| 4 | 300 | 250-300 | 2205 | 36.8 | 2.2 |
| B | 350 | 600 | 2082 | 30.6 | 2.1 |

TABLE 1c

Copolyester Composition (Amounts in mole percent)

| Ex. | "R"-substituted hydroquinone | R | BP | T | 1,4HBA | TBHBA |
|---|---|---|---|---|---|---|
| 5 | 26.7 | phenyl | 6.7 | 33.3 | — | 33.3 |
| C | 26.7 | phenyl | 6.7 | 33.3 | 33.3 | — |

TABLE 2c

Properties of Copolyesters

| Ex. | Inherent Viscosity (dL/g) | Density (g/cc) | Tg(°C.) | Mp(°C.) | Opt. Anis. Melt |
|---|---|---|---|---|---|
| 5 | 3.00 | 1.2542 | 155 | None | Yes |
| C | 4.65 | 1.3203 | 156 | 315 | Yes |

TABLE 3c

Flexural Properties of Copolyesters

| Ex. | Injection Temp (°C.) | Pressure (psi) | Modulus (Kpsi) | Strength (Kpsi) | Elong @ Break(%) |
|---|---|---|---|---|---|
| 5 | 310 | 280 | 2067 | 38.2 | 2.7 |
| C | 340 | 250–500 | 2775 | 36.5 | 2.1 |

TABLE 1d

Copolyester Composition (Amounts in mole percent)

| Ex. | "R"-substituted hydroquinone | R | BP | T | 1,4HBA | TBHBA |
|---|---|---|---|---|---|---|
| 6 | 26.7 | chlorine | 6.7 | 33.3 | 16.65 | 16.65 |
| 7 | 26.7 | " | 6.7 | 33.3 | — | 33.3 |
| D | 26.7 | chlorine | 6.7 | 33.3 | 33.3 | — |

TABLE 2d

Properties of Copolyesters

| Ex. | Inherent Viscosity (dL/g) | Density (g/cc) | Tg(°C.) | Mp(°C.) | Opt. Anis. Melt |
|---|---|---|---|---|---|
| 6 | 4.75 | 1.3680 | 142 | None | Yes |
| 7 | 4.16 | 1.3282 | 150 | None | Yes |
| D | insoluble | 1.4099 | 110 | 276 | Yes |

TABLE 3d

Flexural Properties of Copolyesters

| Ex. | Injection Temp (°C.) | Pressure (psi) | Modulus (Kpsi) | Strength (Kpsi) | Elong @ Break(%) |
|---|---|---|---|---|---|
| 6 | 300 | 500 | 3046 | 35.5 | 2.1 |
| 7 | 310 | 400 | 2320 | 28.1 | 1.1 |
| D | 320 | 600–900 | 1448 | 14.8 | 1.4 |

The data presented in Tables 2a–d and 3a–d indicate that the substitution of a t-butyl group on the hydroxybenzoic acid component of these copolyester resins results in copolyesters with reduced levels of crystallinity and, therefore, improved processability. This effect is particularly prominent for the copolyester of Example 1. The related comparative compound, that of Comparative Example A, was highly crystalline, became solid and immobile during the polymerization, and could not be injection molded, whereas the copolyester of Example 1 was molded easily at 330 degrees C. The crystalline melting endotherm observed for resins derived from phenyl- or chlorohydroquinone (Comparative Examples C and D) was eliminated when the 3-t-butyl-4-hydroxybenzoic acid was used (Examples 5 and 7). All copolyesters in Examples 1–7 could be injection molded below 330 deg. C., most at 300–310 deg. C. While the resin of Comparative Example B (with 20 mole % 1,4HBA) was difficult processed at 350 deg. C., the resin of Example 2 (with 20 mole % TBHBA) was molded easily at 310 deg. C.

The copolyesters of Examples 1–7 had $T_g$'s of 142–181 deg. C., were generally non-crystalline, and had flexural modulus/strength/elongation at break of 1.1–3.0 Kpsi/18–38 Kpsi/1.1–2.7%. The incorporation of the 3-t-butyl-4-hydroxybenzoic acid was also found to dramatically lower the density of the copolyesters of Examples 1–7 relative to the comparative examples.

What is claimed is:

1. A copolyester capable of forming an optically anisotropic melt consisting essentially of:
   I. an aromatic diol component consisting of about 55 to 95 mole % of one or more diols of the formula

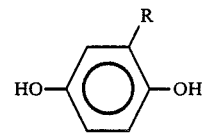

where R is selected from the group consisting of H, $C_1$–$C_4$ alkyl or alkoxy, $C_6$–$C_{10}$ aryl or aryloxy, and halogen; and about 5 to 45 mole % of one or more polyaromatic diols;
   II. a dicarboxylic acid component selected from a "para"- or "meta"-oriented aromatic dicarboxylic acid or mixtures of such acids, provided that no more than 60 mole % of the dicarboxylic acid component comprises a naphthalene dicarboxylic acid; and
   III. an aromatic hydroxycarboxylic acid consisting of about 25 to 100 mole % of t-butyl-4-hydroxybenzoic acid and about 0 to 75 mole % of 4-hydroxybenzoic acid, provided that when R=H, the aromatic hydroxycarboxylic acid component consists solely of a t-butyl-4-hydroxybenzoic acid;
   where said copolyester contains equal chemical equivalents of components I and II and contains about 15 to 60 mole %, based on total moles of I plus II plus III, of component III.

2. A copolyester of claim 1 in which the aromatic diol component comprises 5 to 30 mole % of one or more diols selected from 4,4'-biphenol, bisphenol-A, 3-hydroxy-4'-(4-hydroxyphenyl)benzophenone, 3,4' or 4,4'-dihydroxybenzophenone, 2,6- or 2,7-dihydroxynaphthalene, 4,4-dihydroxydiphenylsulfone, 4,4'-dihydroxydiphenylether, and 4,4'-dihydroxydiphenylsulfide.

3. A copolyester of claim 2 in which the aromatic diol component comprises 10 to 25 mole % of 4,4'-biphenol or bisphenol-A or a mixture thereof.

4. A copolyester of claim 1 where the aromatic diol component comprises about 70 to 95 mole % of one or more diols selected from the group consisting of unsubstituted hydroquinone and hydroquinone mono-substituted with a substituent selected from methyl, chlorine, phenyl and t-butyl.

5. A copolyester of claim 4 where the aromatic diol component comprises about 75 to 90 mole % of one or more diols selected from unsubstituted hydroquinone and hydroquinone mono-substituted with a substitutent selected from phenyl, chlorine and t-butyl.

6. A copolyester of claim 1 where the dicarboxylic acid is selected from the group consisting of terephthalic acid, and mixtures of terephthalic acid with isophthalic acid or, 2,6-naphthalene dicarboxylic acid, provided that at least 50 mole % of the dicarboxylic acid component is terephthalic acid.

7. A copolyester of claim 6 where the dicarboxylic acid is terephthalic acid.

8. A copolyester of claim 1 in which the t-butyl-4-hydroxybenzoic acid is 3-t-butyl-4-hydroxybenzoic acid.

9. A copolyester of claim 1 which contains about 20–50 mole % of said hydroxycarboxylic acid component and said hydroxycarboxylic acid component consists of 75 to 100 mole % of 3-t-butyl-4-hydroxybenzoic acid and about 0 to 25 mole % of 4-hydroxybenzoic acid.

10. A copolyester of claim 9 which contains about 20–35 mole % of said hydroxycarboxylic acid component and said hydroxycarboxylic acid component is 3-t-butyl-4-hydroxybenzoic acid.

11. A copolyester of claim 1 wherein the aromatic diol component (I) consists essentially of about 5 to 30 mole % of one or more diols selected from the group consisting of 4,4'-biphenol, bisphenol-A, 3-hydroxy-4'-(4-hydroxyphenyl)benzophenone, 3,4'- or 4,4'-dihydroxybenzophenone, 2,6- or 2,7-dihydroxy-naphthalene, 4,4'-dihydroxydiphenylsulfone, 4,4'-dihydroxydiphenylether, and 4,4'-dihydroxydiphenylsulfide, and about 95 to 70 mole % of one or more diols selected from the group consisting of unsubstituted hydroquinone and hydroquinone mono-substituted with a substitutent selected from methyl, chlorine, phenyl and t-butyl;

the aromatic diacid component (II) is selected from the group consisting of terephthalic acid and mixtures of isophthalic acid or 2,6-naphthalene dicarboxylic acid with greater than 50 mole % terephthalic acid;

the aromatic hydroxycarboxylic acid component (III) is selected from 3-t-butyl-4-hydroxybenzoic acid and mixtures of 3-t-butyl-4-hydroxybenzoic acid with up to about 25 mole % 4-hydroxybenzoic acid;

and the copolyester contains about 20 to 50 mole %, based on total moles of I+II+III, of component III.

12. A copolyester of claim 1 wherein
the aromatic diol component (I) is 75–90 mole % of one or more diols selected from unsubstituted hydroquinone or hydroquinone mono-substituted with a phenyl group, a t-butyl group, or chlorine, and is 10–25 mole % of one or more polyaromatic diols selected from 4,4-biphenol and bisphenol-A;
the aromatic diacid component (II) is terephthalic acid;
the aromatic hydroxycarboxylic acid component (III) is 3-t-butyl-4-hydroxybenzoic acid;

and the copolyester contains about 20 to 35 mole %, based on total moles of I+II+III, of component III.

13. A shaped article obtained by extruding, compression molding or injection molding a copolyester of claim 1.

14. A shaped article obtained by extruding, compression molding or injection molding a copolyester of claim 11.

15. A shaped article obtained by extruding, compression molding or injection molding a copolyester of claim 12.

16. A composite structure consisting essentially of (a) a copolyester of claim 1 and (b) either a fibrous substrate or a particulate filler.

17. A composite structure consisting essentially of (a) a copolyester of claim 11 and (b) either a fibrous substrate or a particulate filler.

18. A composite structure consisting essentially of (a) a copolyester of claim 12 and (b) either a fibrous substrate or a particulate filler.

19. A composite structure consisting essentially of (a) one or more resins and (b) a fibrous substrate of a copolyester of claim 1.

20. A composite structure consisting essentially of (a) one or more resins and (b) a fibrous substrate of a copolyester of claim 11.

21. A composite structure consisting essentially of (a) one or more resins and (b) a fibrous substrate of a copolyester of claim 12.

22. A copolyester of claim 1 which has an inherent viscosity of at least about 1.5 dL/g measured at 25 degrees C. in a 50/50 by volume mixture of 1,2-dichloroethane and 4-chlorophenol.

23. A process for preparing a copolyester of claim 1 comprising contacting under reaction conditions the diacetates of the aromatic diols, the mono-acetates of the hydroxyacid(s), and the dicarboxylic acid(s) in the desired quantities such that a molar excess of about 0.1 to 4 mole % of the diol

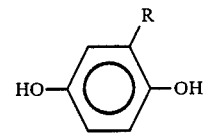

is present and so that there are otherwise substantially equimolar quantities of acetate and carboxylic acid moieties.

* * * * *

UNITED STATES PATENT AND TRADEMARK OFFICE
CERTIFICATE OF CORRECTION

PATENT NO. : 4,746,566
DATED : May 24, 1988
INVENTOR(S) : Mark S. Connolly

It is certified that error appears in the above-identified patent and that said Letters Patent is hereby corrected as shown below:

In the fourth line of the abstract, the number "20" should be replaced by the number -- 15 --.

In column 6, line 27, the word "east" should be replaced by the word -- ease --.

In column 12, line 1, the numbers "1.1-3.0" should be replaced by the numbers -- 1100-3000 --.

Signed and Sealed this

Twenty-second Day of November, 1988

Attest:

DONALD J. QUIGG

Attesting Officer

Commissioner of Patents and Trademarks